Aug. 9, 1966 R. KOEHLER 3,265,085
MULTIPLE-RING VALVE
Filed Oct. 15, 1963
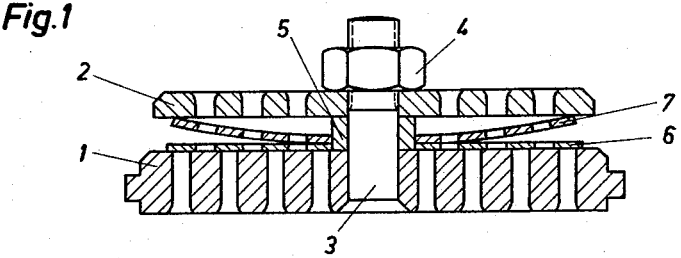
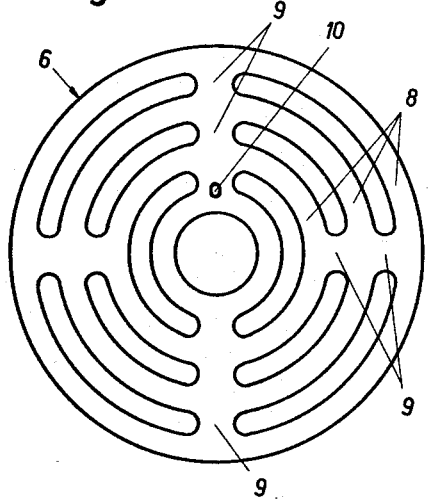
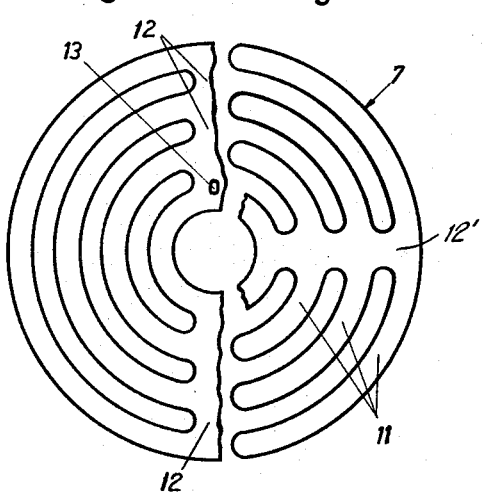
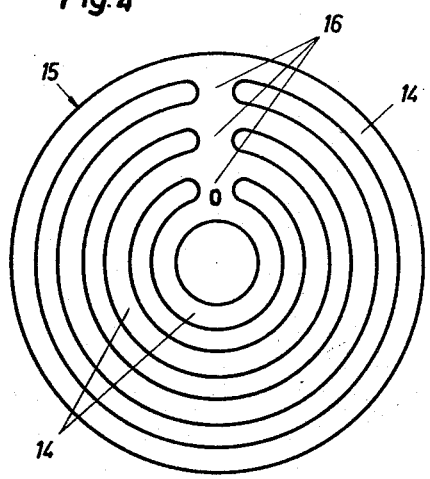
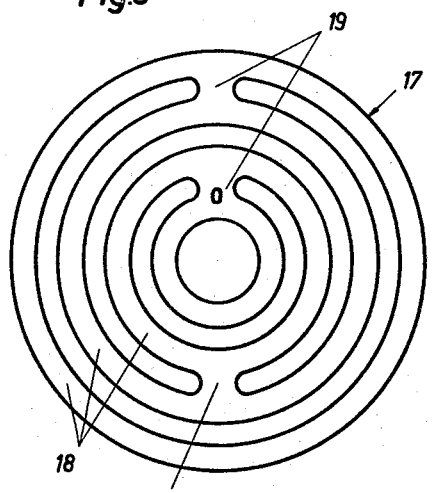
Inventor
Robert Koehler
By
Watson, Cole, Grindle + Watson
Atty.

United States Patent Office 3,265,085
Patented August 9, 1966

3,265,085
MULTIPLE-RING VALVE
Robert Koehler, Schongau, Lech, Upper Bavaria, Germany, assignor to Hoerbiger Ventilwerke Aktiengesellschaft, Vienna, Austria
Filed Oct. 15, 1963, Ser. No. 316,404
Claims priority, application Austria, Nov. 10, 1962,
A 8,850/62
8 Claims. (Cl. 137—512.15)

This invention relates to multiple-ring valves, in particular for use in combination with piston-type compressors, comprising closing members consisting of solid slotted valve plates loaded by at least one arcuate spring plate formed by concentrical rings interconnected by webs.

In conventional multiple-ring valves of this type adjacent rings of the spring plates are interconnected by means of a plurality of radial webs distributed over the periphery, the spring plates being arcuate so as to produce a cylindrical surface. These spring plates are relatively rigid and therefore have to be made of some thin material in order to obtain the high degree of elasticity frequently required. However, since thin spring plates are liable to be damaged or destroyed by the opening impacts of the stronger and more massive valve plates, in particular when used in combination with high-speed piston-type compressors, generally entailing breakage of the valve plate, the increase of elasticity to be achieved by this means is negligible.

In another known type comprising valve plates having concentrical rings interconnected by means of a plurality of radial webs, the spring plates present a plate-like curvature in the shape of a truncated cone. In order to increase the elasticity of these equally rigid spring plates, corrugated radial webs have been devised without any noteworthy success but at additional manufacturing costs. Furthermore, it is already known in the art to provide part of the rings of the said plate-shaped spring plates with radial slots. This partitioning of the valve plates, however, entails further drawbacks, particularly insofar as their solidity is impaired and consequently, the risk of breakage increased.

It is the object of the present invention to eliminate the shortcomings of conventional types by providing a spring plate of improved elasticity or flexibility not liable to be damaged even by rough working conditions.

According to the invention adjacent rings of each spring plate are interconnected by not more than two webs, all of the webs of the spring plate being located on the same plate diameter, and at least one ring of each spring plate is vaulted so as to produce an approximately cylindrical surface, the generating lines of which extend parallel to the plate diameter traversing the webs. The spring plate according to the invention, even if it is made of thicker material so as to ensure greater operational safety, is relatively soft and distinguishes itself by low bending stresses, since the freely springing portions of the arcuate rings are of adequate length. Thus inherent tensions, in particular internal tensions due to irregular heating, are avoided to a considerable extent and as a result of the increased elasticity of the spring plate both in the direction of their plane and in perpendicular relation thereto the operational stresses are reduced. As a result, the life of the spring plates is increased and the risk of breakage eliminated to a considerable extent.

A further advantage resulting from the design of the spring plates according to the invention is smooth operation of the valve. When the valve is closed, the valve plate is loaded by the spring plate alongside one diameter only, so that it will be easier for the valve plate to lift itself from the valve seat in such places where no load exists. In addition, the impact of the valve plate on the valve guard is subdued as a result of the fact that the slightly arcuate or flat rings of the spring plate act simultaneously as a damping plate.

In the valve according to the invention, the design of the springs may be adapted to given requirements. In particular, it is possible to use either a single spring plate or a plurality of spring plates either inserted parallel into each other or facing each other with their concave sides, and the number of arcuate rings provided may be varied to suit individual spring plates. Another advantage of the invention resides in the avoidance of scouring on the part of the extremities of springs in the valve plate, as is liable to occur for example in the case of spring plates comprising radial slots, since the spring plate according to the invention comprises endless bowsprings produced from solid rings. This advantage is achieved particularly in such cases where the spring plate adjoining the valve plate rests with its convex side on the valve plate and consequently, is in contact with the latter alongside its web only.

According to a further embodiment of the invention the adjacent rings of each spring plate are interconnected by means of one web each only, all of the webs being located on the same side of the plate center. However, according to the invention, the webs of rings interconnected by a single web each, can also be located on different sides of the plate center. Both measures tend to further increase the softness and elasticity of the spring plates as compared with the type wherein adjacent rings are interconnected by two diametrically opposite webs each, located on the same plate diameter. According to the invention, adaptation to the rigidity of the spring plates can also be achieved by severing part of the rings of the spring plates at least at one point of their periphery, preferably in the center of the free ring portions between the webs, approximately in a radial direction.

According to another embodiment of the invention, the advantageous elastic behaviour of the mobile elements of the valve in operation can be further improved by providing spring plates and valve plate of about the same thickness. Likewise, the concentrical rings of the valve plate can be preferably interconnected by no more than two webs, all webs of the valve plate being located on the same plate diameter, preferably in the same arrangement as with the spring plate. In combination with the design of the spring plates according to the invention this adaptation of the thickness and shape of the valve plate to those of the spring plate offers a noteworthy advantage insofar as the elastic operation of the valve is thereby still further improved. Besides, the risk of breakage is eliminated to a considerable extent because the mechanical stress of the valve plate is correspondingly reduced as a result of its elastic operation and the attenuation of the valve plate impacts upon the valve seat and the valve guard and/or upon the spring plates inserted between.

Further details of the invention will appear from the following description of several embodiments of the invention with reference to the accompanying drawings in which:

FIG. 1 shows an axial cross-section of a ring valve according to the invention,
FIG. 2 is a plan view of the valve plate,
FIG. 3A is a plan view of a portion of the spring plate,
FIG. 3B is a plan view of a portion of a modified spring plate,
FIGS. 4 and 5 each illustrate another type of spring plate according to the invention as viewed from above.

The ring valve shown in FIG. 1 comprises a valve seat 1 and a valve guard 2, both members being centered and positively attached to each other by means of a bolt 3 and nut 4. Between the valve seat 1 and the valve guard 2 a washer 5 is provided, which determines the distance between the said members and also serves as a guide for the valve plate 6 and the spring plate 7 loading the former. As appears from FIG. 2, the valve plate 6 comprises four concentrical rings 8 interconnected by means of webs 9, four webs 9 being provided between each pair of adjacent rings 8, said webs being offset by 90° in relation to each other. In the area of a web 9 an oblong hole 10 is provided for the passage of a pin (not shown) fixed in the valve seat 1 or in the valve guard 2, said pin securing the valve plate 6 and the spring plate 7 against rotation.

The spring plate 7 shown in FIG. 3 in flat condition also comprises four solid rings 11 which are, however, interconnected by only two webs 12 each, all of the webs 12 of the spring plate 7 being located on the same plate diameter. In addition, the rings 11 are arcuate so as to produce a cylindrical surface, the generating lines of which extend parallel to the plate diameter traversing the webs 12. The oblong hole provided for securing the valve plate and the spring plate against rotation is designated by reference number 13. In view of the fact that the webs 12 are located on a single plate diameter only, the elastic portions of the rings 11 are of an appropriate length so that the spring plate 7 distinguishes itself by its softness and considerable elasticity.

When incorporated in the valve system as shown in FIG. 1, the arcuate spring plate 7 rests with its convex side on the valve plate 6 and is in contact with same alongside its webs 12 only. The outer, valuted ring 11 is supported by the valve guard 2. Consequently, the valve plate 6 is lifted off the valve seat 1 during the opening operation first in the area of the outer rings 8 loaded by the valve plate 7 only slightly or not at all and if of a convenient elastic design, will adapt itself more or less snugly to the contours of the spring plate 7. As soon as the inner rings 11 of the spring plate 7 come to bear upon the valve plate 6 as the stroke progresses, the force exerted on theh valve plate 6 increases, as a result of which the impact of the valve plate 6 on the valve guard 2 is attenuated. Thus the spring plate 7 acts simultaneously as a damping plate. When the valve is closed, the spring tension decreases so that the impact of the valve plate 6 on the valve seat 1 is again attenuated, thereby reducing both the strain on the valve plate 6 and the operational noise. Consequently, the valve plate 6 can be made thinner than in conventional types, being for example of the same thickness as the spring plate 7. Furthermore, the design according to the invention also entails less wear of the valve plate 6, since the respective webs of the valve plate 6 and the spring plate 7 rest against each othehr so that scouring between the plates is avoided.

The further embodiment of the spring plate as shown in FIGS. 4 and 5 differ from the one illustrated in FIG. 3 only in the lesser number of webs interconnecting adjacent rings. In both instances adjacent rings of each spring plate are interconnected by means of one web only. As appears from FIG. 4, all of the webs 16 interconnecting the rings 14 of the spring plate 15 are located on the same side of the plate center, whereas with the spring plate 17 illustrated in FIG. 5 the webs 19 interconnecting the rings 18 are alternatingly located on different sides of the plate center. Here too, the rings 14, 18 of the spring plates 15, 17 are cylindrically arched. Both embodiments result in a further improvement of the elasticity of the spring plates.

The rigidity of the spring plates according to the invention can be altered by splitting part of the rings to suit particular requirements. For example, in the embodiment, shown in FIG. 3B, the three outer rings 11 can be split approximately in a radial direction preferably in the middle between webs 12 at 12′, whereas the inner ring 11 remains intact to ensure the unity of the spring plate. With spring plates as illustrated in FIGS. 4 and 5, however, the rings may be radially split at one point of their periphery only. The radial slots of the individual rings can also be located at various points of the periphery of the spring plate and also in the area of the webs, if necessary.

According to the invention, the spring plates and/or the valve plate can also be provided with a guide in lieu of the slide illustrated in the drawing. Furthermore, the spring plates can be so arranged as to face the valve plate with their concave side and likewise, a plurality of spring plates can be used in any suitable arrangement or a single spring plate in a valve only. With a valve plate whose rings are also interconnected by two webs only, located on the same plate diameter, the spring plate and valve plate diameters traversing the webs may extend either parallel or in perpendicular relation to each other. Moreover, if plurality of spring plates is provided, these can be arranged in an alternating order. Finally, the scope of the invention is not restricted to the design of the valve plate as shown in the drawing by way of example, but it is possible, within the scope of the invention, to use valve plates of any shape.

I claim:
1. multiple-ring valve, particularly for piston-type compressors, comprising a valve seat and a valve guard arranged in spaced relation thereto, a closing member located between the valve seat and the valve guard and loaded by means of at least one arcuate spring plate formed by concentrical rings interconnected by webs, wherein adjacent rings of each spring plate are interconnected by not more than two webs, all of the webs of the spring plate being located on the some plate diameter, and at least one ring of each spring plate is vaulted so as to produce an approximately cylindrical surface, the generating lines of which extend parallel to the plate diameter traversing the webs.

2. A multiple-ring valve according to claim 1, wherein adjacent rings of each spring plate are interconnected by one web each only, all of the webs being located on the same side of the plate center.

3. A multiple-ring valve according to claim 1, wherein adjacent rings of each spring plate are interconnected by one web each only, the webs being located alternatingly on various sides of the plate center.

4. A multiple-ring valve according to claim 1, wherein part of the rings of the spring plate are split approximately in a radial direction at least at one point of their periphery.

5. A multiple-ring valve according to claim 1, wherein part of the rings of the spring plate are radially split in the middle of the free ring portions between the webs.

6. A multiple-ring valve according to claim 1, wherein the spring plate and the valve plate are of approximately the same thickness.

7. A multiple-ring valve according to claim 1, the closing member consisting of a valve plate formed by concentrical rings interconnected by webs, wherein the concentrical rings of the valve plate are also interconnected by two webs at the most, all of the webs of the valve plate being located on the same plate diameter.

8. A multiple-ring valve according to claim 7, wherein all of the webs of the valve plate are provided in the same arrangement as with the spring plate, thereby both the valve plate and the spring plate show the same plan view.

References Cited by the Examiner
UNITED STATES PATENTS 3,123,095    3/1964    Kohler _____ 137—516.23

WILLIAM F. O'DEA, *Primary Examiner.*

D. ZOBKIW, *Examiner.*